(12) United States Patent
Diwakar et al.

(10) Patent No.: US 11,732,794 B2
(45) Date of Patent: Aug. 22, 2023

(54) AXLE ASSEMBLY HAVING A LUBRICANT RESERVOIR

(71) Applicant: ArvinMeritor Technology, LLC, Troy, MI (US)

(72) Inventors: Nikethan Diwakar, Troy, MI (US); Nagaraja Gargeshwari, Troy, MI (US); Sanjeev Kumar, Bangalore (IN); Robert Opperman, Troy, MI (US); Ramesh Ranjan, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/673,320

(22) Filed: Feb. 16, 2022

(65) Prior Publication Data

US 2022/0412450 A1    Dec. 29, 2022

(30) Foreign Application Priority Data

Jun. 29, 2021 (IN) .............................. 202111029125

(51) Int. Cl.
| | | |
|---|---|---|
| *F16H 57/04* | (2010.01) | |
| *F16H 57/025* | (2012.01) | |
| *F16H 57/037* | (2012.01) | |
| *F16H 57/02* | (2012.01) | |

(52) U.S. Cl.
CPC ....... *F16H 57/0471* (2013.01); *F16H 57/025* (2013.01); *F16H 57/037* (2013.01); *F16H 57/0409* (2013.01); *F16H 57/0457* (2013.01); *F16H 57/0483* (2013.01); *F16H 2057/02052* (2013.01)

(58) Field of Classification Search
CPC .............. F16H 57/037; F16H 57/0409; F16H 57/0457; F16H 57/0483; F16H 2057/02052

See application file for complete search history.

(56) References Cited

U.S. PATENT DOCUMENTS

| | | |
|---|---|---|
| 2,242,195 A | 5/1941 | Teker et al. |
| 3,025,716 A | 3/1962 | Muller |
| 4,068,541 A | 1/1978 | Sakamoto et al. |
| 4,594,912 A | 6/1986 | Ishikawa |
| 5,540,300 A | 7/1996 | Downs et al. |

(Continued)

FOREIGN PATENT DOCUMENTS

| | | |
|---|---|---|
| DE | 710894 | 9/1941 |
| DE | 1023354 A1 | 1/1992 |

(Continued)

OTHER PUBLICATIONS

First Examination Report dated Mar. 23, 2023 for related India Application No. 202111029125; 6 pages.

(Continued)

*Primary Examiner* — Daniel D Yabut
(74) *Attorney, Agent, or Firm* — Brooks Kushman PC

(57) ABSTRACT

An axle assembly that includes a differential carrier, a bearing cap, and a lubricant reservoir. The differential carrier has a bearing support. The bearing cap is disposed on the bearing support. The lubricant reservoir is mounted on the bearing cap and is configured to capture lubricant that is splashed by the differential assembly.

20 Claims, 7 Drawing Sheets

(56) References Cited

U.S. PATENT DOCUMENTS

| | | | |
|---|---|---|---|
| 5,813,493 A * | 9/1998 | Sloan | F16H 57/0421 |
| | | | 184/6.12 |
| 6,132,329 A | 10/2000 | Fison | |
| 6,135,241 A | 10/2000 | Ganguly et al. | |
| 8,858,381 B2 | 10/2014 | Trost | |
| 8,974,342 B2 | 3/2015 | Kwasniewski et al. | |
| 9,267,596 B2 | 2/2016 | Trost | |
| 9,677,661 B2 | 6/2017 | Bodary | |
| 9,797,502 B2 | 10/2017 | Hayes et al. | |
| 9,816,603 B2 | 11/2017 | Hayes et al. | |
| 9,989,139 B2 * | 6/2018 | Martin | F16H 48/22 |
| 10,036,467 B2 | 7/2018 | Keane et al. | |
| 10,161,502 B2 * | 12/2018 | Kwasniewski | F16H 57/0445 |
| 10,167,944 B2 | 1/2019 | Kwasniewski et al. | |
| 2012/0295751 A1 | 11/2012 | Okada | |
| 2015/0354691 A1 * | 12/2015 | Keeney | F16H 57/0483 |
| | | | 74/607 |
| 2017/0276232 A1 * | 9/2017 | Hayes | F16H 57/0457 |
| 2018/0045298 A1 * | 2/2018 | Kwasniewski | F16H 57/045 |
| 2018/0372209 A1 * | 12/2018 | Carmean | F16H 57/0424 |
| 2021/0293324 A1 * | 9/2021 | Goni | F16H 57/0423 |

FOREIGN PATENT DOCUMENTS

| | | | | |
|---|---|---|---|---|
| EP | 1375970 | | 10/2008 | |
| EP | 3098478 | | 2/2017 | |
| EP | 2660493 | | 4/2017 | |
| GB | 2054485 | | 5/1983 | |
| JP | S5937462 | | 2/1984 | |
| JP | 2006183717 A | * | 7/2006 | F16H 57/0421 |
| JP | 2012210839 | | 11/2012 | |
| WO | 2015092471 A1 | | 6/2015 | |
| WO | 2015141783 | | 9/2015 | |
| WO | 2019177882 A1 | | 9/2019 | |

OTHER PUBLICATIONS

Extended European Search Report dated Dec. 2, 2022 for related European Application No. 22181668.9; 19 pgs.

* cited by examiner

AXLE ASSEMBLY HAVING A LUBRICANT RESERVOIR

TECHNICAL FIELD

This relates to an axle assembly that has a lubricant reservoir. The lubricant reservoir may be mounted to a bearing cap that is associated with supporting a differential assembly.

BACKGROUND

An axle assembly having a lubricant reservoir is disclosed in U.S. Pat. No. 10,167,944.

SUMMARY

In at least one embodiment an axle assembly is provided. The axle assembly may include a differential carrier, a bearing cap, and a lubricant reservoir. The differential carrier may have a bearing support. The bearing cap may be disposed on the bearing support and may cooperate with the bearing support to encircle a bearing that rotatably supports a differential assembly. The lubricant reservoir may be mounted on the bearing cap and may capture lubricant that is splashed by the differential assembly.

In at least one embodiment an axle assembly is provided. The axle assembly may include a differential carrier, a differential assembly, a bearing cap, and a lubricant reservoir. The differential carrier may have a bearing support. The differential assembly may have a ring gear and may be rotatable about an axis. The bearing cap may be disposed on the bearing support and may cooperate with the bearing support to receive a bearing that rotatably supports the differential assembly. The lubricant reservoir may be mounted on the bearing cap and may have a reservoir tank that captures lubricant that is splashed by the differential assembly. The reservoir tank may have an inboard tank portion and an outboard tank portion. The inboard tank portion may define an opening that receives splashed lubricant. The outboard tank portion may extend from the inboard tank portion in a direction that extends away from the ring gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
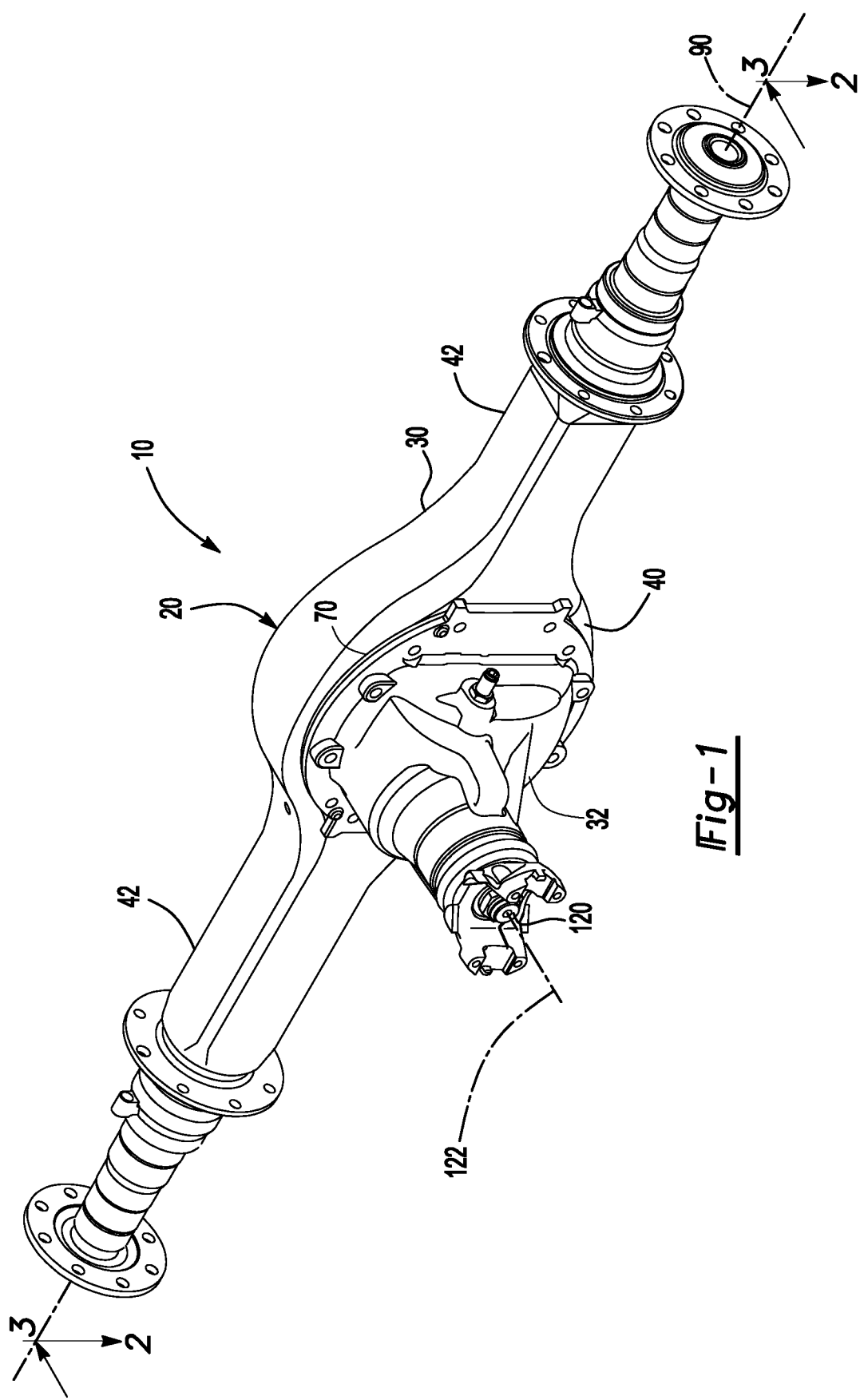
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies connected in series. As is best shown with reference to FIGS. 1 and 2, the axle assembly 10 may include a housing assembly 20, a differential assembly 22, and at least one axle shaft 24. Referring to FIG. 3, the axle assembly 10 may also include a dam 26, a lubricant reservoir 28, or both.

Figure 2:
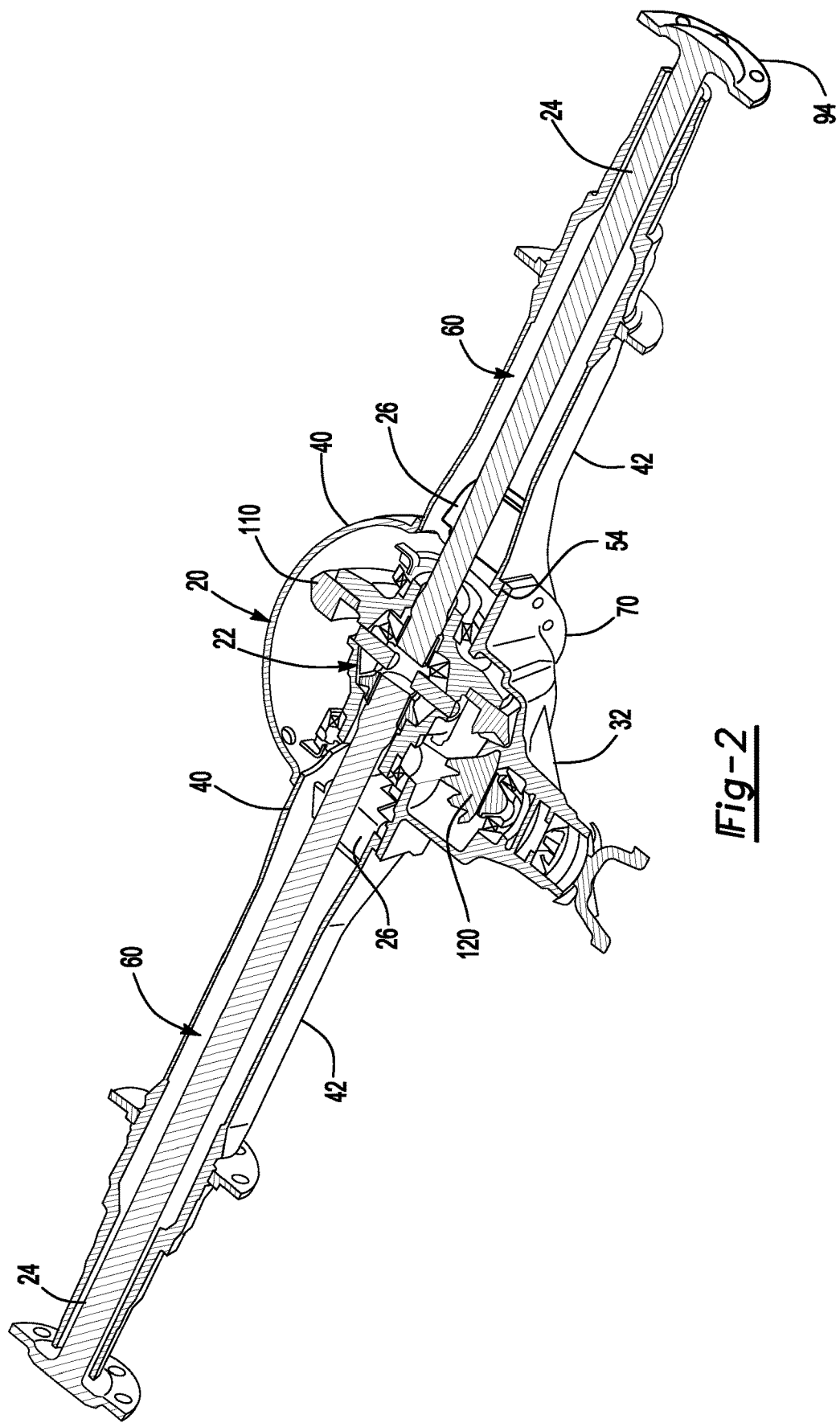
FIG. 2 is a section view of the axle assembly along section line 2-2.
Figure 3:
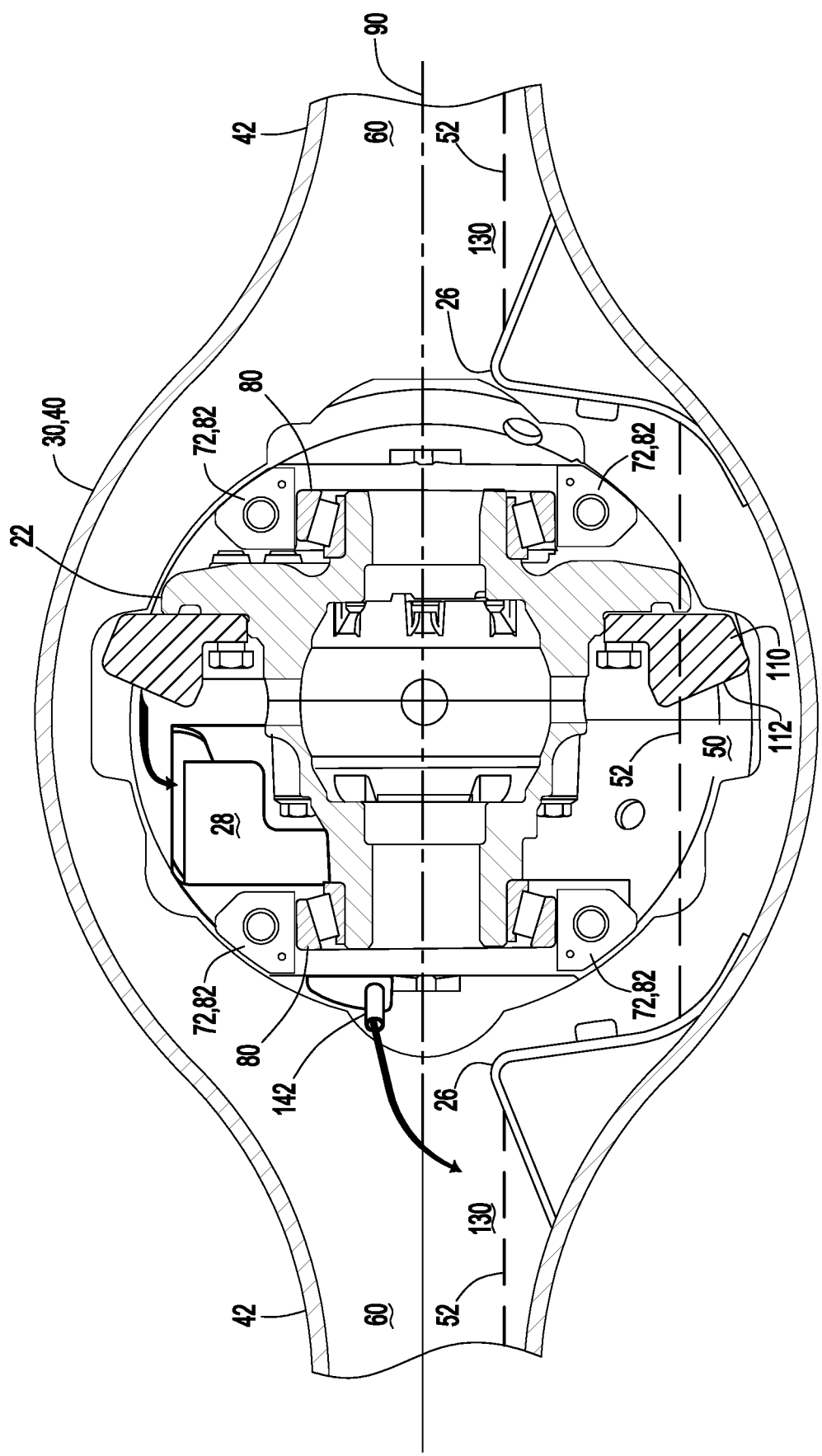
FIG. 3 is a section view of a portion of the axle assembly along section line 3-3 with axle shafts and internal components of a differential assembly omitted for clarity.

Referring to FIGS. 1 and 2, the housing assembly 20 may receive various components of the axle assembly 10. In addition, the housing assembly 20 may facilitate mounting of the axle assembly 10 to the vehicle. In at least one configuration, the housing assembly 20 may include an axle housing 30 and a differential carrier 32.

The axle housing 30 may receive and support the axle shafts 24. In at least one configuration, the axle housing 30 may include a center portion 40 and at least one arm portion 42.

The center portion 40 may be disposed proximate the center of the axle housing 30. As is best shown in FIG. 2, the center portion 40 may define an internal cavity that may at least partially receive the differential assembly 22. The internal cavity may also receive a portion of a dam 26. As is best shown in FIG. 3, a lower region of the center portion 40 may at least partially define a sump portion 50 that may contain or collect lubricant 52. Lubricant 52 in the sump portion 50 may be splashed by the differential assembly 22 when the differential assembly 22 rotates. Some splashed lubricant 52 may be captured or collected by the lubricant reservoir 28 as will be discussed in more detail below.

The lubricant 52, which may be a liquid such as oil, may lubricate components of the axle assembly 10, such as the differential assembly 22 and various bearings. In FIG. 3, the level of the lubricant 52 in the arm portions 42 and the sump portion 50 is represented by the dashed lines. The lubricant levels are merely exemplary and may be higher or lower than what is depicted.

Referring to FIG. 2, center portion 40 may also include a carrier mounting surface 54. The carrier mounting surface 54 may face toward and may engage the differential carrier 32. The carrier mounting surface 54 may facilitate mounting of the differential carrier 32 to the axle housing 30. For example, the carrier mounting surface 54 may have a set of holes that may be aligned with corresponding holes on the differential carrier 32. Each hole may receive a fastener, such as a bolt, that may couple the differential carrier 32 to the axle housing 30.

Referring to FIGS. 1 and 2, one or more arm portions 42 may extend from the center portion 40. For example, two arm portions 42 may extend in opposite directions from the center portion 40 and away from the differential assembly 22. The arm portions 42 may have similar configurations. For example, the arm portions 42 may each have a hollow configuration or tubular configuration that may extend around a corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity 60 that may receive a corresponding axle shaft 24. The arm portion 42 and arm cavity 60 may be disposed above the sump portion 50 as is best shown in FIG. 3.

Referring to FIGS. 1 and 2, the differential carrier 32 may be mounted to the center portion 40 of the axle housing 30. The differential carrier 32 may support components of the differential assembly 22. In at least one configuration and as is best shown in FIGS. 4 and 6, the differential carrier 32 may include a flange portion 70 and a bearing support 72.

Referring to FIGS. 1 and 2, the flange portion 70 may facilitate mounting of the differential carrier 32 to another component of the axle assembly 10, such as the axle housing 30. For example, the flange portion 70 may be disposed proximate and may engage the carrier mounting surface 54 of the axle housing 30 and may have a set of holes that may receive fasteners as previously discussed.

Figure 4:
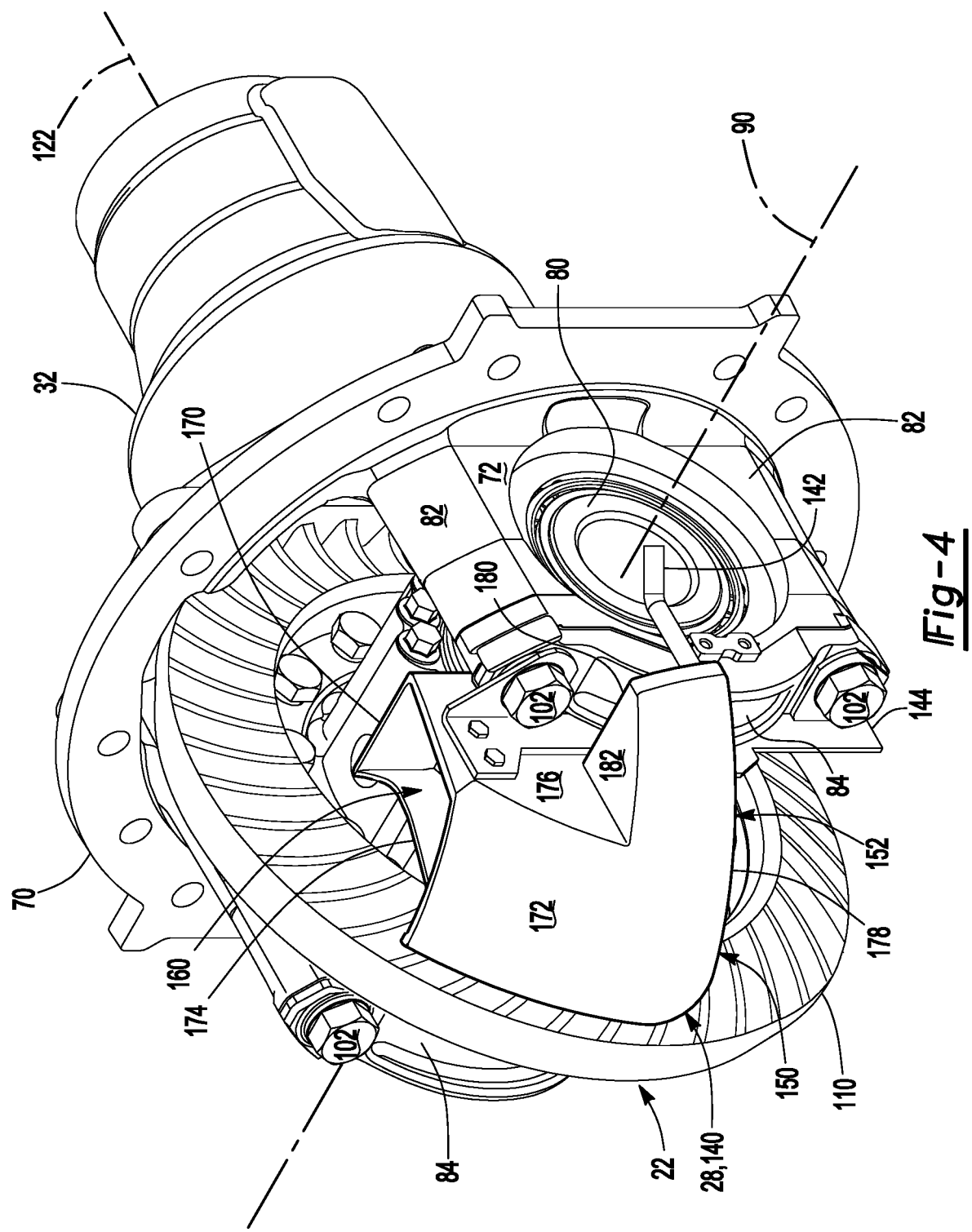
FIG. 4 is a perspective view of a portion of the axle assembly including the differential assembly, a differential carrier, and a lubricant reservoir.
Figure 6:
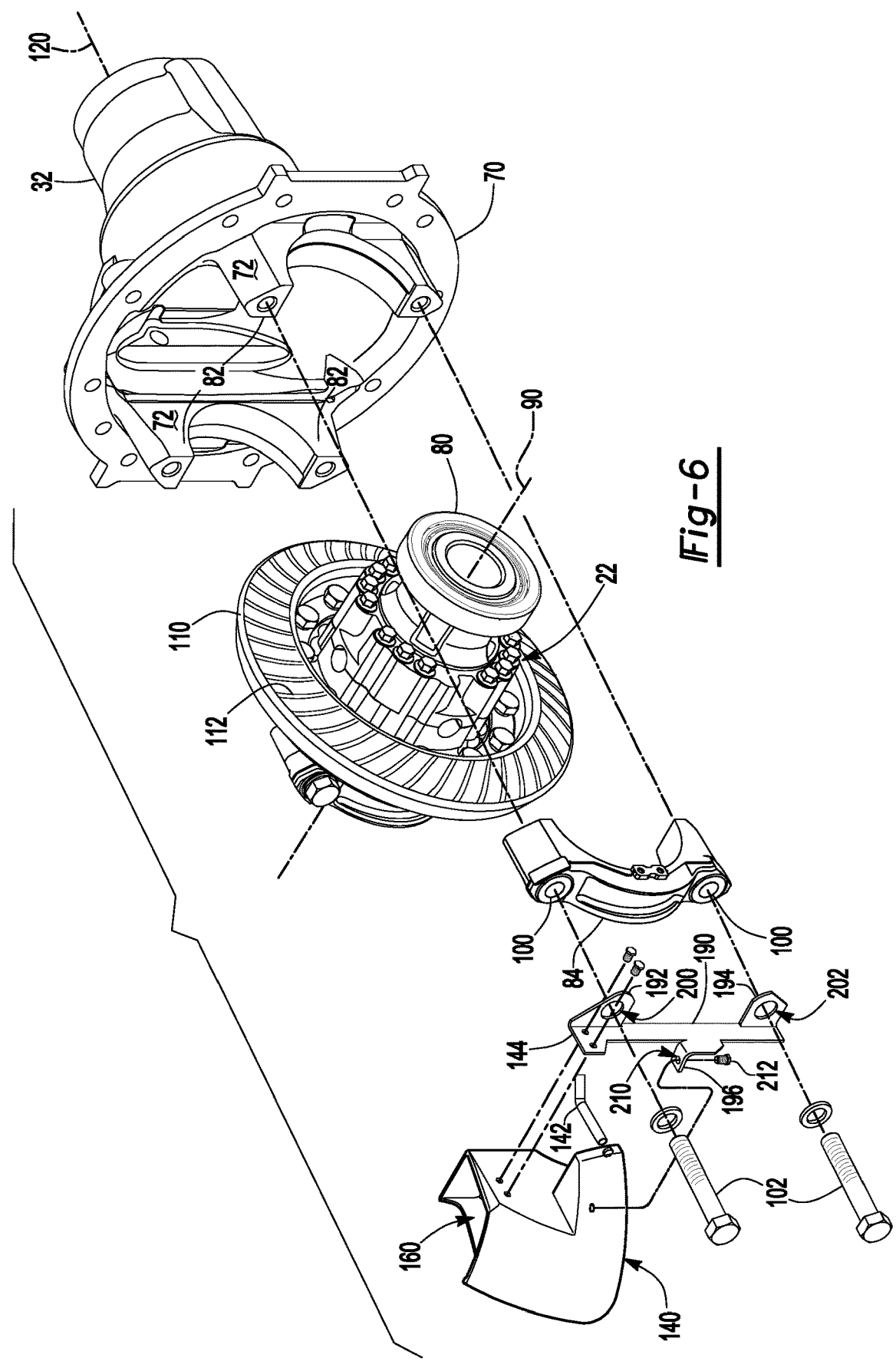
FIG. 6 is an exploded view of the portion of the axle assembly shown in FIG. 4.

Referring to FIGS. 3, 4, and 6, the bearing support 72 may receive a bearing 80 that may rotatably support the differential assembly 22. The bearing 80 may have any suitable configuration. For instance, the bearing 80 may be a roller bearing assembly. In the configuration shown, two bearing supports 72 are provided with the differential carrier 32. The bearing supports 72 may be received inside the center portion 40 of the axle housing 30 and may be disposed proximate opposite ends of the differential assembly 22. The bearing support 72 may include a pair of legs 82 that extend from the differential carrier 32 toward the axle housing 30.

Referring to FIGS. 4 and 6, a bearing cap 84 may be disposed on the bearing support 72. Only one bearing cap 84 is shown in FIG. 6 for clarity. The bearing cap 84 may be mounted to the pair of legs 82 and may arch over the bearing 80. As such, the bearing support 72 and bearing cap 84 may cooperate to extend around and encircle the bearing 80 and may cooperate to receive and secure the bearing 80. The bearing support 72 and the bearing cap 84 may also extend around or encircle an axis 90 about which the differential assembly 22 may rotate.

As is best shown in FIG. 6, the bearing cap 84 may include a pair of holes 100. Each hole may receive a fastener 102, such as a bolt, that may couple the bearing cap 84 to the bearing support 72. For convenience in reference, the hole 100 that is located above the axis 90 from the perspective shown in FIGS. 3 and 6 may be referred to as an upper hole and a hole that is located below the axis 90 may be referred to as a lower hole. Each fastener 102 may also be received in a corresponding hole in a leg 82 of the bearing support 72.

Referring to FIGS. 2-4, the differential assembly 22 may be at least partially received inside the center portion 40 of the axle housing 30. The differential assembly 22 may be rotatable about the axis 90 and may transmit torque to the axle shafts 24 and wheels. The differential assembly 22 may be operatively connected to the axle shafts 24 and may permit the axle shafts 24 to rotate at different rotational speeds in a manner known by those skilled in the art.

The differential assembly 22 may have a ring gear 110 that may be fixedly mounted to a case of the differential assembly 22. The ring gear 110 may be rotatable about the axis 90 and may splash lubricant 52 that accumulates in the sump portion 50 as it rotates. The ring gear 110 may have a set of teeth 112 that may be arranged around the axis 90. The teeth 112 may face toward lubricant reservoir 28 and may mate or mesh with the teeth of a gear portion of a drive pinion 120, which is best shown in FIGS. 1 and 2. Accordingly, the differential assembly 22 may receive torque from the drive pinion 120 via the ring gear 110 and transmit torque to the axle shafts 24.

The drive pinion 120 may operatively connect a power source to the differential assembly 22. The power source may be an electrical power source like an electric motor or a non-electrical power source like an internal combustion engine. As such, the drive pinion 120 may transmit torque between the differential assembly 22 and the power source. In at least one configuration, the drive pinion 120 may be rotatable about a drive pinion axis 122, which is best shown in FIG. 1, and may be rotatably supported by the differential carrier 32.

Referring to FIGS. 1 and 2, the axle shafts 24 may transmit torque from the differential assembly 22 to corresponding traction wheel assemblies. Two axle shafts 24 may be provided such that each axle shaft 24 extends through a different arm cavity 60. The axle shafts 24 may extend along and may be rotated about an axis, such as the axis 90. Each axle shaft 24 may have a first end and a second end. The first end may be operatively connected to the differential assembly 22. The second end may be disposed opposite the first end and may be operatively connected to a wheel end assembly that may have a wheel hub that may support a wheel.

Referring to FIGS. 2 and 3, a dam 26 may be disposed in the axle housing 30 and may help capture or store a volume of lubricant 52 in the arm cavity 60 remotely from the sump portion 50. For example, the dam 26 may be fixedly mounted to the axle housing 30, may be at least partially disposed in the arm portion 42, may be completely disposed below an axle shaft 24 that extends through the arm portion 42 that receives the dam 26, or combinations thereof. The dam 26 may cooperate with the arm cavity 60 to at least partially define an arm reservoir 130. The arm reservoir 130 may be configured to store a volume of lubricant 52 in the arm portion 42. Storing lubricant 52 in the arm reservoir 130 may reduce the amount of lubricant 52 in the sump portion 50. In addition, lubricant 52 in the arm reservoir 130 may lubricate a roller bearing assembly that may rotatably support the axle shaft 24 and that may be located near the end of the arm portion 42 that is disposed opposite the center portion 40. An example of a dam 26 is disclosed in U.S. Pat. No. 10,167,944, which is hereby incorporated by reference in its entirety.

Referring to FIGS. 3 and 4, the lubricant reservoir 28 may capture lubricant 52 that is splashed by the differential assembly 22. The lubricant reservoir 28 may be disposed in the center portion 40 of the axle housing 30 and may be mounted on the bearing cap 84 that teeth 112 of the ring gear 110 extend toward. Moreover, the lubricant reservoir 28 may be disposed above the sump portion 50. The lubricant reservoir 28 may be spaced apart from and may not engage the differential assembly 22, the axle housing 30, the differential carrier 32, or combinations thereof. In at least one configuration and as is best shown in FIGS. 4-7, the lubricant reservoir 28 may include a reservoir tank 140, an outlet pipe 142, and a bracket 144.

Figure 5:
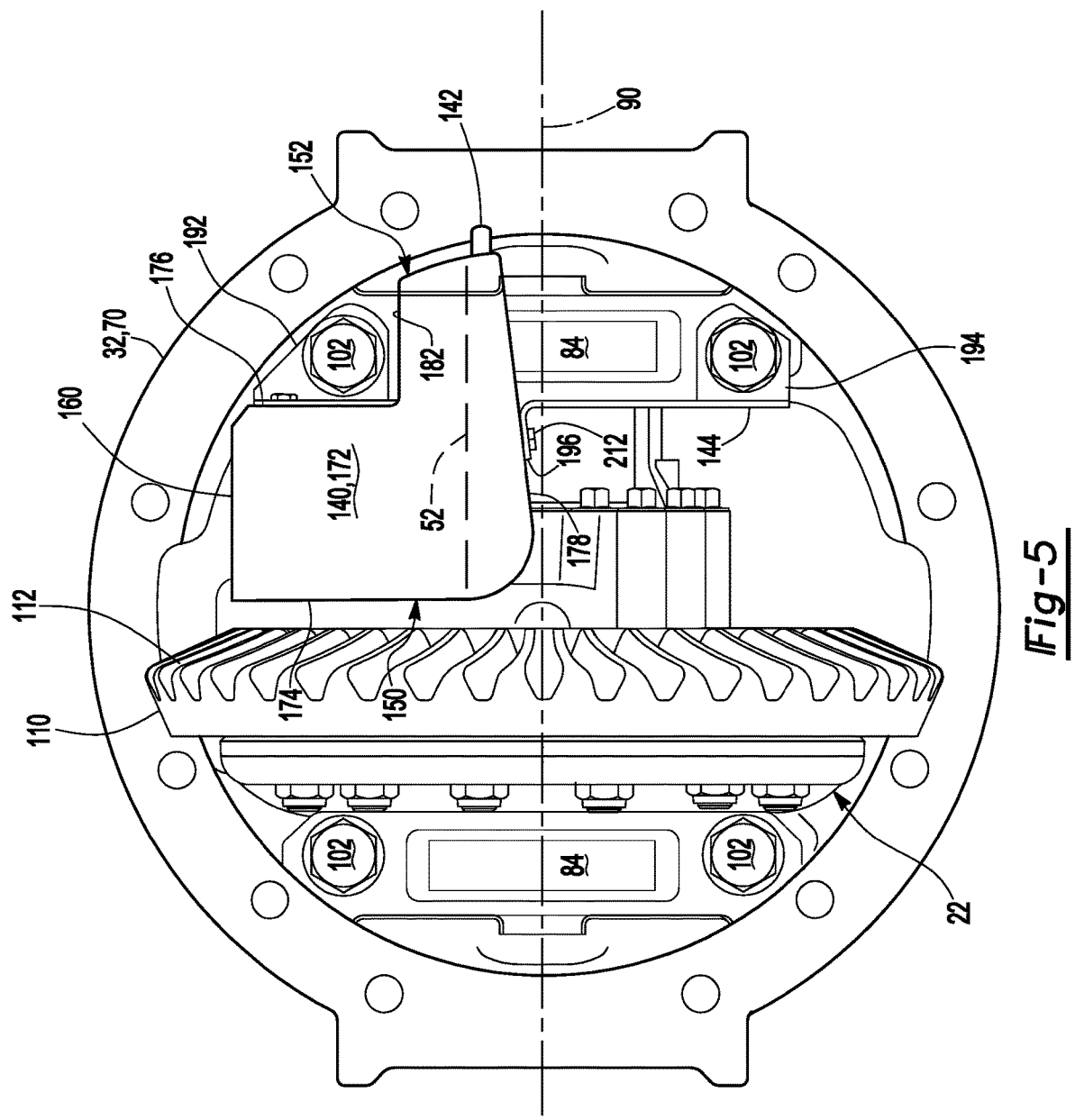
FIG. 5 is a side view of the portion of the axle assembly shown in FIG. 4.

The reservoir tank 140 may be a portion of the lubricant reservoir 28 that may capture and contain lubricant 52. As is best shown in FIG. 5, the reservoir tank 140 may be completely disposed above the axis 90. In at least one configuration, the reservoir tank 140 may include an inboard tank portion 150 and an outboard tank portion 152.

Referring primarily to FIGS. 4 and 5, the inboard tank portion 150 may define an opening 160 that may receive splashed lubricant 52. The inboard tank portion 150 may be positioned closer to the ring gear 110 than the outboard tank portion 152. For instance, the inboard tank portion 150 may be laterally positioned or positioned in a direction that extends along or parallel to the axis 90 between the ring gear 110 and the bearing cap 84 to which the reservoir tank 140 is mounted as is best shown in FIG. 5. In addition, the inboard tank portion 150 may extend above the top of the bearing cap 84 and thus may be located closer to the teeth 112 of the ring gear 110 and closer to where lubricant 52 may be flung from the ring gear 110 when it rotates. As is best shown in FIGS. 4 and 6, the inboard tank portion 150, its opening 160, or both may be at least partially defined by a front wall 170, a rear wall 172, an inboard wall 174, an outboard wall 176, and a bottom wall 178.

The front wall 170 may face toward the differential carrier 32 and the case of the differential assembly 22. The front wall 170 or a portion thereof may be disposed substantially perpendicular to the axis 90 in one or more configurations. The term "substantially parallel" means the same as or very close to parallel and includes features or axes that are within ±2° of being parallel each other.

The rear wall 172 may be disposed opposite the front wall 170. The rear wall 172 may face toward the axle housing 30 and may follow the contour or shape of the axle housing 30. In at least one configuration, the rear wall 172 or a portion thereof may be a curved nonplanar surface.

The inboard wall 174 may extend from the front wall 170 to the rear wall 172 and may face toward the ring gear 110. As is best shown in FIG. 7, the inboard wall 174 or a portion thereof may be disposed below the top of the front wall 170, the top of the rear wall 172, or both, to help better capture lubricant 52 that may be flung from or splashed by the ring gear 110.

Figure 7:
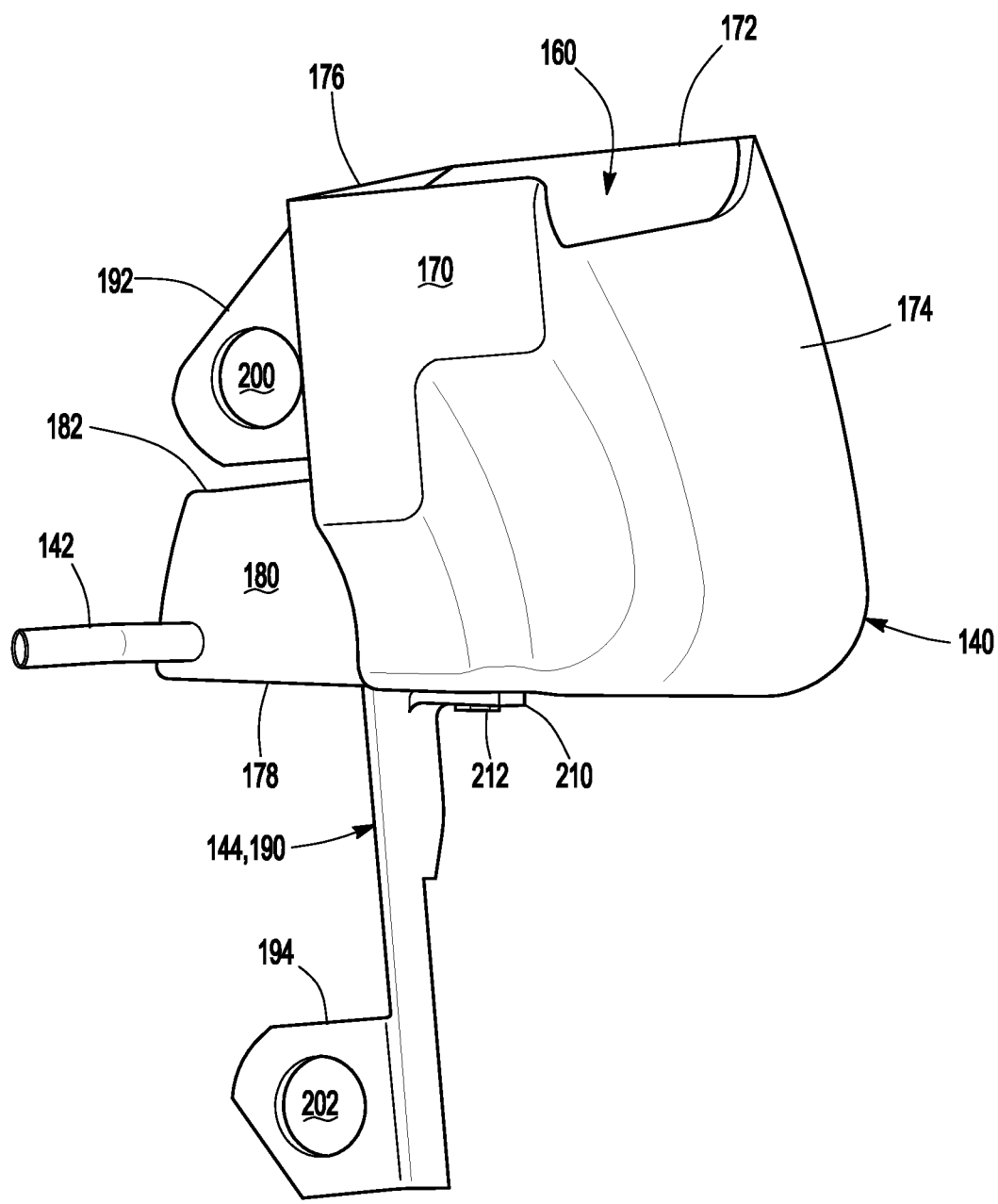
FIG. 7 is a perspective view of the lubricant reservoir.

Referring to FIGS. 4, 5, and 7, the outboard wall 176 may be disposed opposite the inboard wall 174. The outboard wall 176 may extend from the front wall 170 to the rear wall 172 and may face away from the ring gear 110. The outboard wall 176 may have a shorter height than the inboard wall 174 and may extend upward from the outboard tank portion 152.

Referring primarily to FIGS. 4 and 5, the bottom wall 178 may define a bottom of the inboard tank portion 150 and the outboard tank portion 152. The bottom wall 178 may extend from the front wall 170 to the rear wall 172. As is best shown in FIG. 5, the bottom wall 178 may slope upward from the inboard tank portion 150 to the outboard tank portion 152. For instance, the bottom wall 178 may extend from the inboard wall 174 away from the ring gear 110 such that the bottom wall 178 extends further above the axis 90 as the distance from the inboard wall 174 increases.

Referring primarily to FIGS. 4 and 5, the outboard tank portion 152 may cooperate with the inboard tank portion 150 to define a tank cavity that may receive and at least temporarily store lubricant 52. The outboard tank portion 152 may extend the tank cavity in a direction that extends laterally away from the ring gear 110 and may have a smaller volume than the inboard tank portion 150. For instance, the outboard tank portion 152 may extend laterally or in a direction that extends along or parallel to the axis 90 past the bearing cap 84 as is best shown in FIG. 5. In at least one configuration and as is best shown in FIGS. 4 and 7, the outboard tank portion 152 may be at least partially defined by the rear wall 172 and the bottom wall 178. In addition, the outboard tank portion 152 may also be at least partially defined by a frontal wall 180, and a top wall 182.

The frontal wall 180 may face toward the bearing cap 84. The frontal wall 180 or a portion thereof may be disposed substantially perpendicular to the axis 90 in one or more configurations. The frontal wall 180 may be offset from the front wall 170 such that the frontal wall 180 may be disposed further from the axis 90 than the front wall 170 is disposed from the axis 90. The frontal wall 180 may extend vertically from the bottom wall 178 to the top wall 182. In at least one configuration, the frontal wall 180 or a portion thereof may be disposed substantially parallel to the front wall 170.

The top wall 182 may be disposed above and may be spaced apart from the bottom wall 178. The top wall 182 may extend from the frontal wall 180 to the rear wall 172 in a generally horizontal direction. In addition, the top wall 182 may extend from an end of the outboard wall 176 away from the ring gear 110.

Referring to FIGS. 3, 4, and 7, the outlet pipe 142 may receive lubricant 52 from the lubricant reservoir 28. For instance, the outlet pipe 142 may be fluidly connected to the outboard tank portion 152. The outlet pipe 142 may route or direct lubricant 52 from the lubricant reservoir 28 to the arm portion 42 and an associated arm reservoir 130. For example, the outlet pipe 142 may extend from a wall of the outboard tank portion 152, such as the bottom wall 178 or the frontal wall 180, toward the axis 90 and/or toward an arm portion 42. As is best shown in FIG. 3, lubricant 52 that exits the outlet pipe 142 may be directed or sprayed to a side of the dam 26 that may be disposed opposite the differential assembly 22 and into an associated arm reservoir 130. The outlet pipe 142 or a portion thereof may slope downwardly from the lubricant reservoir 28 toward an arm portion 42 to facilitate the flow of lubricant 52 through the outlet pipe 142. In at least one configuration, the outlet pipe 142 may be disposed above the axle shaft 24 and the dam 26.

Referring primarily to FIGS. 4, 6, and 7, the bracket 144 may facilitate mounting of the reservoir tank 140. For instance, the reservoir tank 140 may be mounted to the bracket 144 and the bracket 144 may be disposed on the bearing cap 84. In at least one configuration, the bracket 144 may include a body 190, a first flange 192, a second flange 194, a support flange 196, or combinations thereof.

The body 190 may extend in a generally vertical direction. The body 190 may extend along and may engage an inboard side of the bearing cap 84 that may face toward the ring gear 110.

The first flange 192 may be disposed proximate a top end of the body 190. The first flange 192 may engage a side of the bearing cap 84 that may face away from the bearing support 72 and may facilitate mounting of the bracket 144. For instance, the first flange 192 may define a first hole 200 that may be generally aligned with the upper hole 100 in the bearing cap 84. A fastener 102 may extend through the first hole 200 and the upper hole 100 to couple the bracket 144 and the bearing cap 84 to the bearing support 72. The inboard tank portion 150 may extend above the first flange 192.

The second flange 194 may be spaced apart from the first flange 192. The second flange 194 may be disposed proximate a bottom end of the body 190. The second flange 194 may engage a side of the bearing cap 84 that may face away from the bearing support 72 and may facilitate mounting of the bracket 144. For instance, the second flange 194 may define a second hole 202 that may be generally aligned with the lower hole 100 in the bearing cap 84. A fastener 102 may extend through the second hole 202 and the lower hole 100 to couple the bracket 144 and the bearing cap 84 to the bearing support 72. The outboard tank portion 152 may be disposed below the first flange 192 and above the second flange 194.

The support flange 196 may support the reservoir tank 140. The support flange 196 may extend from the body 190 and may be positioned below the first flange 192 and above the second flange 194. The support flange 196 may be positioned below or underneath the reservoir tank 140. For instance, the support flange 196 may engage the bottom wall 178 and may optionally be fastened to the bottom wall 178 of the reservoir tank 140. As an example, the support flange 196 may define a support flange hole 210, which is best shown in FIG. 6, through which a fastener 212 like a bolt may extend. The fastener 212 may be fastened to the bottom wall 178 to secure the reservoir tank 140 to the support flange 196.

An axle assembly as described above may provide a lubricant reservoir in the center portion of the axle housing that may be installable with the differential carrier. The lubricant reservoir may be disposed above the sump portion and may be well-positioned to capture splashed lubricant to help reduce the lubricant level in the sump portion, thereby helping reduce churning losses or frictional drag on the differential assembly. Reducing churning losses and frictional drag may help improve the operating efficiency of the axle assembly and may reduce energy consumption. Providing a lubricant reservoir in the center portion of the axle housing may help reduce lubricant levels in the sump portion to a greater degree than in an axle assembly that does not have such a lubricant reservoir. The lubricant reservoir may also help direct lubricant to an arm reservoir more precisely, such as by using an outlet pipe, as compared to relying on splashing of lubricant to direct a sufficient amount of lubricant past a dam and into an arm portion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a differential carrier that has a bearing support;
a bearing cap that is disposed on the bearing support and that cooperates with the bearing support to encircle a bearing that rotatably supports a differential assembly; and
a lubricant reservoir that is mounted on the bearing cap and that captures lubricant that is splashed by the differential assembly,
wherein the differential assembly has a ring gear and the ring gear is not disposed inside the lubricant reservoir.

2. The axle assembly of claim 1 wherein the lubricant reservoir is spaced apart from and does not engage the differential carrier.

3. The axle assembly of claim 1 wherein the ring gear has teeth that face toward the lubricant reservoir.

4. The axle assembly of claim 1 wherein the lubricant reservoir includes a bracket that engages the bearing cap and a reservoir tank that is mounted to the bracket.

5. The axle assembly of claim 4 wherein the differential assembly is rotatable about an axis and the reservoir tank is completely disposed above the axis.

6. The axle assembly of claim 4 wherein the bracket includes a first flange that engages the bearing cap and that defines a first hole and a second flange that engages the bearing cap and defines a second hole, wherein a first fastener extends through the first hole and through an upper hole in the bearing cap to couple the bracket and the bearing cap to the bearing support and a second fastener extends through the second hole and through a lower hole in the bearing cap to couple the bracket and the bearing cap to the bearing support.

7. The axle assembly of claim 6 wherein the bracket includes a support flange that supports the reservoir tank, wherein the support flange is positioned underneath the reservoir tank.

8. The axle assembly of claim 7 wherein the support flange is positioned below the first flange and above the second flange.

9. The axle assembly of claim 7 wherein the support flange defines a support flange hole and a fastener extends through the support flange hole and secures the reservoir tank to the support flange.

10. An axle assembly comprising:
a differential carrier that has a bearing support;
a differential assembly that is rotatable about an axis and that has a ring gear;
a bearing cap that is disposed on the bearing support and that cooperates with the bearing support to encircle a bearing that rotatably supports a differential assembly; and
a lubricant reservoir that is mounted on the bearing cap and that has a reservoir tank that captures lubricant that is splashed by the differential assembly,
the reservoir tank including an inboard tank portion that defines an opening that receives splashed lubricant and an outboard tank portion that extends from the inboard tank portion in a direction that extends away from the ring gear,
wherein the ring gear is completely disposed outside of the reservoir tank.

11. The axle assembly of claim 10 wherein the inboard tank portion is positioned between the ring gear and the bearing cap.

12. The axle assembly of claim 10 wherein the inboard tank portion extends above the bearing cap.

13. The axle assembly of claim 10 wherein the outboard tank portion extends laterally past the bearing cap.

14. The axle assembly of claim 10 wherein the inboard tank portion has a front wall that faces toward the differential assembly, and the outboard tank portion has a frontal wall that faces toward the bearing cap and is disposed substantially parallel to the front wall of the inboard tank portion.

15. The axle assembly of claim 10 wherein an outlet pipe is fluidly connected to the outboard tank portion and routes lubricant from the reservoir tank to an arm portion of an axle housing.

16. The axle assembly of claim 15 wherein a dam is at least partially disposed in the arm portion of the axle housing and retains lubricant in the arm portion, wherein the outlet pipe routes lubricant to a side of the dam that is opposite the differential assembly.

17. The axle assembly of claim 10 wherein the reservoir tank has a bottom wall that defines a bottom of the inboard tank portion and the outboard tank portion, wherein the bottom wall slopes upward from the inboard tank portion to the outboard tank portion.

18. The axle assembly of claim 17 wherein the lubricant reservoir includes a bracket that engages the bearing cap and that is fastened to the bottom wall.

19. The axle assembly of claim 18 wherein the bracket has a first flange and a second flange that are spaced apart from each other and engage the bearing cap, wherein the inboard tank portion is disposed below the first flange of the bracket and above the second flange of the bracket.

20. The axle assembly of claim 19 wherein the outboard tank portion extends above the second flange.

* * * * *